US012695847B2

(12) United States Patent
Desserrey et al.

(10) Patent No.: US 12,695,847 B2
(45) Date of Patent: \*Jul. 28, 2026

(54) AVATAR CALL PLATFORM

(71) Applicant: Snap Inc., Santa Monica, CA (US)

(72) Inventors: Laurent Desserrey, Los Angeles, CA (US); Alex Edelsburg, Seattle, WA (US); Joseph Engelman, New York, NY (US); Alexander P. Powell, Oakland, CA (US); Arianne Spool, New York, NY (US); Jeremy Baker Voss, Los Angeles, CA (US); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/762,418

(22) Filed: Jul. 2, 2024

(65) Prior Publication Data

US 2024/0357061 A1      Oct. 24, 2024

Related U.S. Application Data

(63) Continuation of application No. 17/558,254, filed on Dec. 21, 2021.

(51) Int. Cl.
*H04N 7/15* (2006.01)
*G06V 40/16* (2022.01)
(Continued)

(52) U.S. Cl.
CPC ........... *H04N 7/157* (2013.01); *G06V 40/166* (2022.01); *H04L 51/046* (2013.01); *H04N 7/147* (2013.01)

(58) Field of Classification Search
CPC ....... H04N 7/157; H04N 7/147; H04L 51/046
See application file for complete search history.

(56) References Cited

U.S. PATENT DOCUMENTS

| | | | |
|---|---|---|---|
| 5,880,731 | A | 3/1999 | Liles et al. |
| 6,023,270 | A | 2/2000 | Brush, II et al. |

(Continued)

FOREIGN PATENT DOCUMENTS

| | | |
|---|---|---|
| CN | 109076188 | 12/2018 |
| CN | 109863532 A | 6/2019 |

(Continued)

OTHER PUBLICATIONS

"International Application Serial No. PCT/US2022/081732, International Preliminary Report on Patentability mailed Jul. 4, 2024", 9 pgs.

(Continued)

*Primary Examiner* — Amal S Zenati
(74) *Attorney, Agent, or Firm* — Schwegman Lundberg & Woessner, P.A.

(57) ABSTRACT

The technical problem of generating a video feed that represents a user who is party to a video call in a manner that invokes the sense of visual presence of the caller without communicating the live video of the user is addressed by configuring a video calling system to include an avatar call platform. The avatar call platform is configured to generate and display a video of an animated figure that represents a caller during a call, in that the face of the animated figure moves in a way that matches what the caller is saying during the call.

20 Claims, 7 Drawing Sheets

(51) Int. Cl.
 *H04L 51/046* (2022.01)
 *H04N 7/14* (2006.01)

(56) References Cited

U.S. PATENT DOCUMENTS

| | | | |
|---|---|---|---|
| 6,223,165 | B1 | 4/2001 | Lauffer |
| 6,772,195 | B1 | 8/2004 | Hatlelid et al. |
| 6,842,779 | B1 | 1/2005 | Nishizawa |
| 7,342,587 | B2 | 3/2008 | Danzig et al. |
| 7,468,729 | B1 | 12/2008 | Levinson |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,146,005 | B2 | 3/2012 | Jones et al. |
| 8,151,191 | B2 | 4/2012 | Nicol |
| 8,384,719 | B2 | 2/2013 | Reville et al. |
| RE44,054 | E | 3/2013 | Kim |
| 8,396,708 | B2 | 3/2013 | Park et al. |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | Andres del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,890,926 | B2 | 11/2014 | Tandon et al. |
| 8,892,999 | B2 | 11/2014 | Nims et al. |
| 8,924,250 | B2 | 12/2014 | Bates et al. |
| 8,963,926 | B2 | 2/2015 | Brown et al. |
| 8,989,786 | B2 | 3/2015 | Feghali |
| 9,086,776 | B2 | 7/2015 | Ye et al. |
| 9,094,571 | B2 | 7/2015 | Yu et al. |
| 9,105,014 | B2 | 8/2015 | Collet et al. |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,460,541 | B2 | 10/2016 | Li et al. |
| 9,489,760 | B2 | 11/2016 | Li et al. |
| 9,503,845 | B2 | 11/2016 | Vincent |
| 9,508,197 | B2 | 11/2016 | Quinn et al. |
| 9,544,257 | B2 | 1/2017 | Ogundokun et al. |
| 9,576,400 | B2 | 2/2017 | Van Os et al. |
| 9,589,357 | B2 | 3/2017 | Li et al. |

| | | | |
|---|---|---|---|
| 9,592,449 | B2 | 3/2017 | Barbalet et al. |
| 9,648,376 | B2 | 5/2017 | Chang et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,362,219 | B2 | 7/2019 | Wilson et al. |
| 10,475,225 | B2 | 11/2019 | Park et al. |
| 10,504,266 | B2 | 12/2019 | Blattner et al. |
| 10,573,048 | B2 | 2/2020 | Ni et al. |
| 10,657,701 | B2 | 5/2020 | Osman et al. |
| 10,904,488 | B1 | 1/2021 | Weisz et al. |
| 2002/0067362 | A1 | 6/2002 | Agostino Nocera et al. |
| 2002/0169644 | A1 | 11/2002 | Greene |
| 2005/0162419 | A1 | 7/2005 | Kim et al. |
| 2005/0206610 | A1 | 9/2005 | Cordelli |
| 2006/0294465 | A1 | 12/2006 | Ronen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2008/0151786 | A1 | 6/2008 | Li et al. |
| 2008/0158222 | A1 | 7/2008 | Li et al. |
| 2009/0016617 | A1 | 1/2009 | Bregman-Amitai et al. |
| 2009/0055484 | A1 | 2/2009 | Vuong et al. |
| 2009/0070688 | A1 | 3/2009 | Gyorfi et al. |
| 2009/0099925 | A1 | 4/2009 | Mehta et al. |
| 2009/0106672 | A1 | 4/2009 | Burstrom |
| 2009/0158170 | A1 | 6/2009 | Narayanan et al. |
| 2009/0177976 | A1 | 7/2009 | Bokor et al. |
| 2009/0202114 | A1 | 8/2009 | Morin et al. |
| 2009/0265604 | A1 | 10/2009 | Howard et al. |
| 2009/0300525 | A1 | 12/2009 | Jolliff et al. |
| 2009/0303984 | A1 | 12/2009 | Clark et al. |
| 2010/0011422 | A1 | 1/2010 | Mason et al. |
| 2010/0023885 | A1 | 1/2010 | Reville et al. |
| 2010/0115426 | A1 | 5/2010 | Liu et al. |
| 2010/0162149 | A1 | 6/2010 | Sheleheda et al. |
| 2010/0203968 | A1 | 8/2010 | Gill et al. |
| 2010/0227682 | A1 | 9/2010 | Reville et al. |
| 2011/0093780 | A1 | 4/2011 | Dunn |
| 2011/0115798 | A1 | 5/2011 | Nayar et al. |
| 2011/0148864 | A1 | 6/2011 | Lee et al. |
| 2011/0239136 | A1 | 9/2011 | Goldman et al. |
| 2012/0113106 | A1 | 5/2012 | Choi et al. |
| 2012/0124458 | A1 | 5/2012 | Cruzada |
| 2012/0130717 | A1 | 5/2012 | Xu et al. |
| 2013/0103760 | A1 | 4/2013 | Golding et al. |
| 2013/0201187 | A1 | 8/2013 | Tong et al. |
| 2013/0249948 | A1 | 9/2013 | Reitan |
| 2013/0257877 | A1 | 10/2013 | Davis |
| 2014/0043329 | A1 | 2/2014 | Wang et al. |
| 2014/0055554 | A1 | 2/2014 | Du et al. |
| 2014/0125678 | A1 | 5/2014 | Wang et al. |
| 2014/0129343 | A1 | 5/2014 | Finster et al. |
| 2014/0192136 | A1 | 7/2014 | Yu et al. |
| 2015/0206349 | A1 | 7/2015 | Rosenthal et al. |
| 2015/0312523 | A1* | 10/2015 | Li ......................... G06F 3/0488 |
| | | | 348/14.03 |
| 2016/0134840 | A1 | 5/2016 | Mcculloch |
| 2016/0234149 | A1 | 8/2016 | Tsuda et al. |
| 2017/0080346 | A1 | 3/2017 | Abbas |
| 2017/0087473 | A1 | 3/2017 | Siegel et al. |

(56)　　　　　　References Cited

U.S. PATENT DOCUMENTS

| | | | |
|---|---|---|---|
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Dusen et al. | |
| 2017/0310934 A1 | 10/2017 | Du et al. | |
| 2017/0312634 A1 | 11/2017 | Ledoux et al. | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0300927 A1 | 10/2018 | Hushchyn et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0130629 A1 | 5/2019 | Chand et al. | |
| 2019/0188920 A1 | 6/2019 | Mcphee et al. | |
| 2019/0340419 A1* | 11/2019 | Milman | G06T 15/02 |
| 2020/0322395 A1* | 10/2020 | Copley | H04N 7/157 |
| 2023/0199147 A1 | 6/2023 | Desserrey et al. | |

FOREIGN PATENT DOCUMENTS

| | | |
|---|---|---|
| CN | 110168478 A | 8/2019 |
| CN | 111316624 | 6/2020 |
| EP | 2184092 A2 | 5/2010 |
| JP | 2001230801 A | 8/2001 |
| JP | 5497931 B2 | 3/2014 |
| KR | 101445263 B1 | 9/2014 |
| KR | 20200034039 | 3/2020 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2022143128 A1 | 7/2022 |
| WO | WO-2023122488 A1 | 6/2023 |

OTHER PUBLICATIONS

"Chinese Application Serial No. 202280083830.8, Voluntary Amendment filed Sep. 23, 2024", w/ English claims, 39 pgs.

"Korean Application Serial No. 10-2024-7024072, Notice of Preliminary Rejection mailed Dec. 3, 2024", w/ English translation, 6 pgs.

"Korean Application Serial No. 10-2024-7024072, Response filed Jan. 21, 2025 to Notice of Preliminary Rejection mailed Dec. 3, 2024", w/ English claims, 21 pgs.

"European Application Serial No. 22850945.1, Response to Communication Pursuant to Rules 161 and 162 EPC Filed Jan. 7, 2025", 18 pgs.

"U.S. Appl. No. 17/558,254, Advisory Action mailed Apr. 18, 2024", 3 pgs.

"U.S. Appl. No. 17/558,254, Examiner Interview Summary mailed Mar. 26, 2024", 2 pgs.

"U.S. Appl. No. 17/558,254, Final Office Action mailed Feb. 8, 2024", 11 pgs.

"U.S. Appl. No. 17/558,254, Non Final Office Action mailed Jul. 19, 2023", 9 pgs.

"U.S. Appl. No. 17/558,254, Notice of Allowance mailed May 22, 2024", 6 pgs.

"U.S. Appl. No. 17/558,254, Response filed Apr. 8, 2024 to Final Office Action mailed Feb. 8, 2024", 10 pgs.

"U.S. Appl. No. 17/558,254, Response filed Nov. 20, 2023 to Non Final Office Action mailed Jul. 19, 2023", 11 pgs.

"International Application Serial No. PCT/US2022/081732, International Search Report mailed Apr. 19, 2023", 6 pgs.

"International Application Serial No. PCT/US2022/081732, Written Opinion mailed Apr. 19, 2023", 7 pgs.

"European Application Serial No. 22850945.1, Communication Pursuant to Article 94(3) EPC mailed Oct. 23, 2025", 8 pgs.

* cited by examiner

500

530

540

510

520

550

ON

OFF

END CALL

AVATAR CALL PLATFORM

CROSS-REFERENCE TO RELATED APPLICATION

This application is a continuation of U.S. patent application Ser. No. 17/558,254, filed Dec. 21, 2021, which is incorporated by reference herein in its entirety.

TECHNICAL FIELD

The present disclosure generally relates to facilitating interactions between client devices over a network.

BACKGROUND

The popularity of computer-implemented tools that permit users to access and interact with content and other users online continues to grow. For example, various computer-implemented tools exist that permit users to interact and share content with other users through messaging applications. Some of such computer-implemented tools, termed applications or apps, can be designed to run on a mobile device such as a phone, a tablet, or a watch. Existing messaging apps permit users to exchange text messages, as well as to make and receive phone calls.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
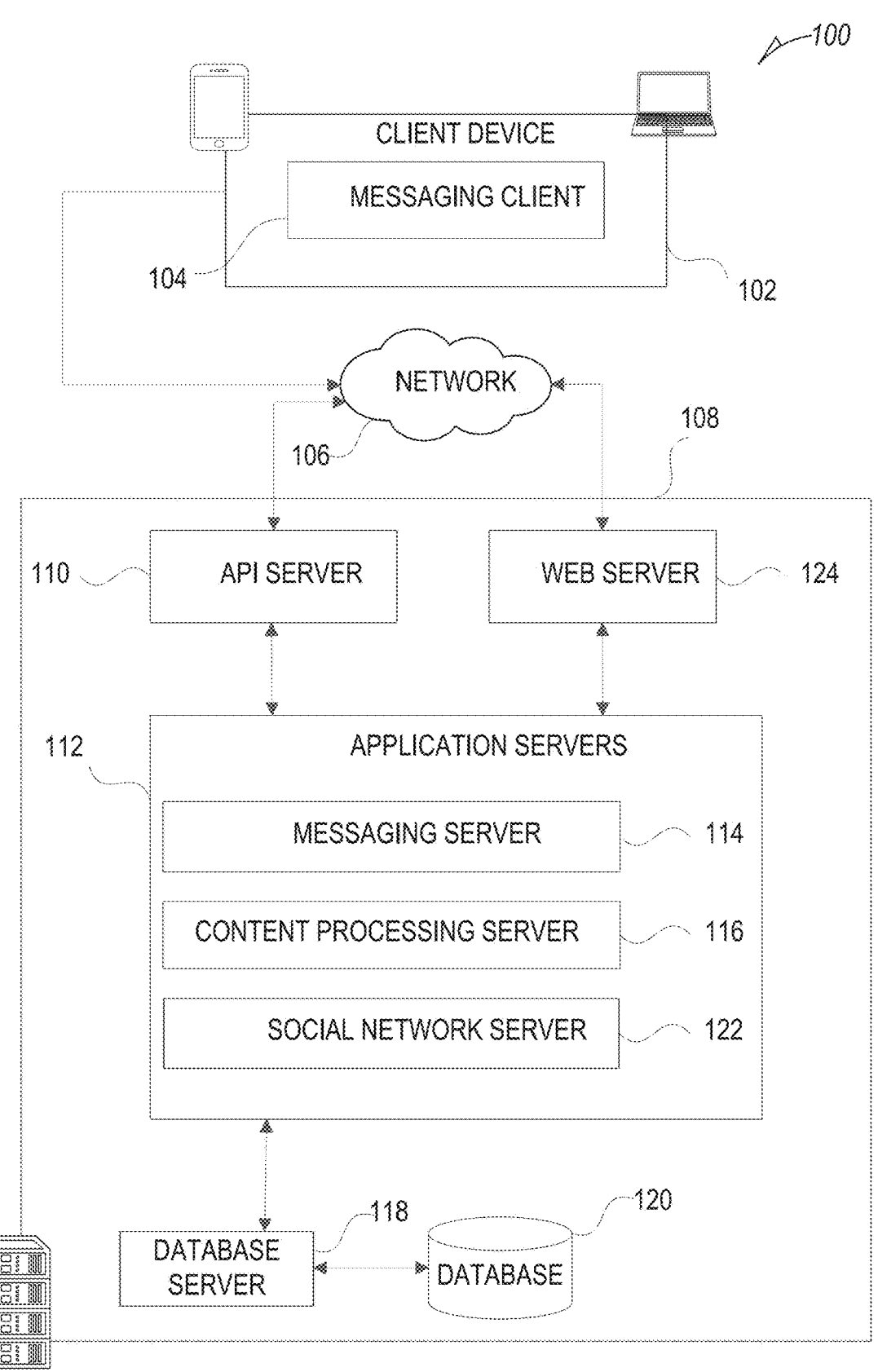
FIG. 1 is a diagrammatic representation of a networked environment in which an avatar call platform may be deployed, in accordance with some examples.

Examples of the present disclosure improve the functionality of electronic software and systems by enhancing users' experience with applications that permit real-time reception and transmission of audio and video signals between client devices. The process, in which users can talk to each other during a call session and, at the same time see each other on the screens of their respective devices, is often referred to as video calling. A video calling system provides video calling functionality by means of video calling applications executing on client devices, in which a video calling application executing at a client device is supported by an associated backend system.

A video calling application may be configured to provide a user with an option to allow video, in which case the other user, who is a party to the video call, can see the user on their screen, or to disallow or turn off the video feed, in which case the screen of the other user displays, in the area designated for a live video feed, a still image or just a solid color background. Permitting a video call may be undesirable is some situations, such as when the person who is a party to the call feels that they do not look their best. Disallowing the video feed is not always a satisfying experience, especially when the other party to the call allows the video feed to be displayed on the screen of their counterpart.

The technical problem of generating a video feed that represents a user who is party to a video call in a manner that invokes the sense of visual presence of the caller without communicating the live video of the user is addressed by configuring a video calling system to include an avatar call platform.

The avatar call platform is configured to generate and display a video of an animated figure that represents a caller during a call, in that the face of the animated figure moves in a way that matches what the caller is saying during the call. A video of an animated figure that represents a caller during a call is referred to as an avatar animation video. An animated figure that represents a user during a call is referred to as the user's avatar image, avatar representation, or simply the user's avatar. An avatar may be selected by a user or automatically selected by the avatar call platform. In some examples, an avatar somewhat resembles the user (for example, in the hair color and length, presence or absence of glasses and/or facial hair, and so on) or it can be any animated figure, such as, e.g., an animated puppy or a character from a children's cartoon.

The avatar call platform provides an intermediate option between a voice call that has no video and a video call, in that it conveys visual indication of the real time face movement of a person speaking, while providing a level of privacy by shielding the person, who chose the avatar call option, from being seen as they are in real time (when they just woke up, for instance). This intermediate option between a voice call that has no video and a video call, in which the area of a user's screen designated for a live video feed displays an animated figure that represents a caller during a call, is referred to as an avatar call option for the purposes of this description. The process that is performed when a video calling application is executing at a client device with an avatar communication process activated, termed the avatar communication process, is described below.

When a call session between a first client device and a second client device is in progress, a video calling application executing at the first client device continuously receives call data from the associated video and/or audio sensors local to the first client device and transmits it over a network to the second client device. The call data that originates locally from the video and/or audio sensors of a client device is termed local call data with respect to that client device, for the purposes of this description. Based on the local call data, the avatar call platform generates avatar animation data, which can be used, together with an avatar image, to create an animated figure that conveys the facial expression and/or the movement of the lips matching what the caller is saying, for example. An animated figure that conveys the facial expression and/or the movement of the lips matching what the caller is saying is referred to as an avatar animation video, for the purposes of this description. The local call data used for generating of the avatar animation data may be, in some examples, video feed obtained by means of the digital image sensor of the camera of the client device. In other examples, the local call data used for generating avatar animation data is audio data obtained through a microphone of the client device.

In some examples, the avatar animation data in the form of hints, generated for respective frames of the video, that represent facial expressions corresponding to the frames of the video. Hints refer to the data points that describe respective locations of facial features in an area representing the face. For example, to draw a slight smile, as shown in area 510 in FIG. 5, which is described below, the hints associated with respective positions of several points in the representation of the mouth can be generated to indicate that the left side of the mouth should be 5 points above neutral, the middle should be 1 point above neutral, and the right side should be 4 points above neutral.

The avatar animation data is used to generate the avatar animation video, which is displayed on a screen local to the client device, such that the user can see the result of the avatar call option being activated. The avatar call platform is also configured to communicate, to the other client device participating in the call session, information for causing the avatar animation video to be displayed on the screen of the other client device. In some examples, a compressed version of the avatar animation video generated at the first client device is communicated to the second client device for display on the screen of the other client device. In other examples, the avatar call platform is configured to communicate the avatar animation data (which can be first compressed) to the second client device, and the avatar animation video is generated at the second client device and then displayed on the screen of the other client device.

A user interacting with a video calling application can activate an avatar communication process in the video calling application, for example, at the time when the user initiates or accepts a call or any time during a call. In some examples, the avatar call platform may detect that a user requested to disallow live video to be captured by their client device during a call and, in response, display a user interface (UI) that includes a user-selectable element that can be activated to engage the avatar call platform. In some examples, the avatar call platform displays a UI that includes a user-selectable element that can be activated to engage the avatar call platform while the camera is still on.

In some examples, the avatar call platform is used in the context of a messaging system that hosts a backend service for an associated messaging client. The messaging system may be referred to as a video calling system and the messaging client may be referred to as the video calling application. A messaging system is described further below with reference to FIG. 1-3. While the avatar call platform is described below in the context of a messaging system, the methodologies described herein can be used advantageously in various computer implemented applications that provide video calling functionality.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include, as examples, message content, client device information, geolocation information, media augmentation and overlays, message content persistence conditions, social network information, live event information, as well as images and video captured with a front facing camera of an associated client device using customized image reprocessing. Data exchanges within the messaging system 100 are invoked and controlled through functions available via user interfaces (UIs) of the messaging client 104. The messaging client 104 presents a camera view UI that displays the output of a digital image sensor of a camera provided with the client device 102, and, also, displays various user-selectable elements that can be activated by touching the area of the screen that displays the user-selectable element. The messaging client 104, in some examples, is configured to include or access the avatar call platform described herein.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an content processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include a content processing server 116 that is dedicated to performing various processing operations with respect to content such as images and video. Information generated by various processing operations with respect to content can be communicated between client devices executing respective messaging clients 104 via the messaging server 114. In some examples, the avatar call platform is supported, on the server side, by the content processing server 116 and the messaging server 114.

Figure 3:
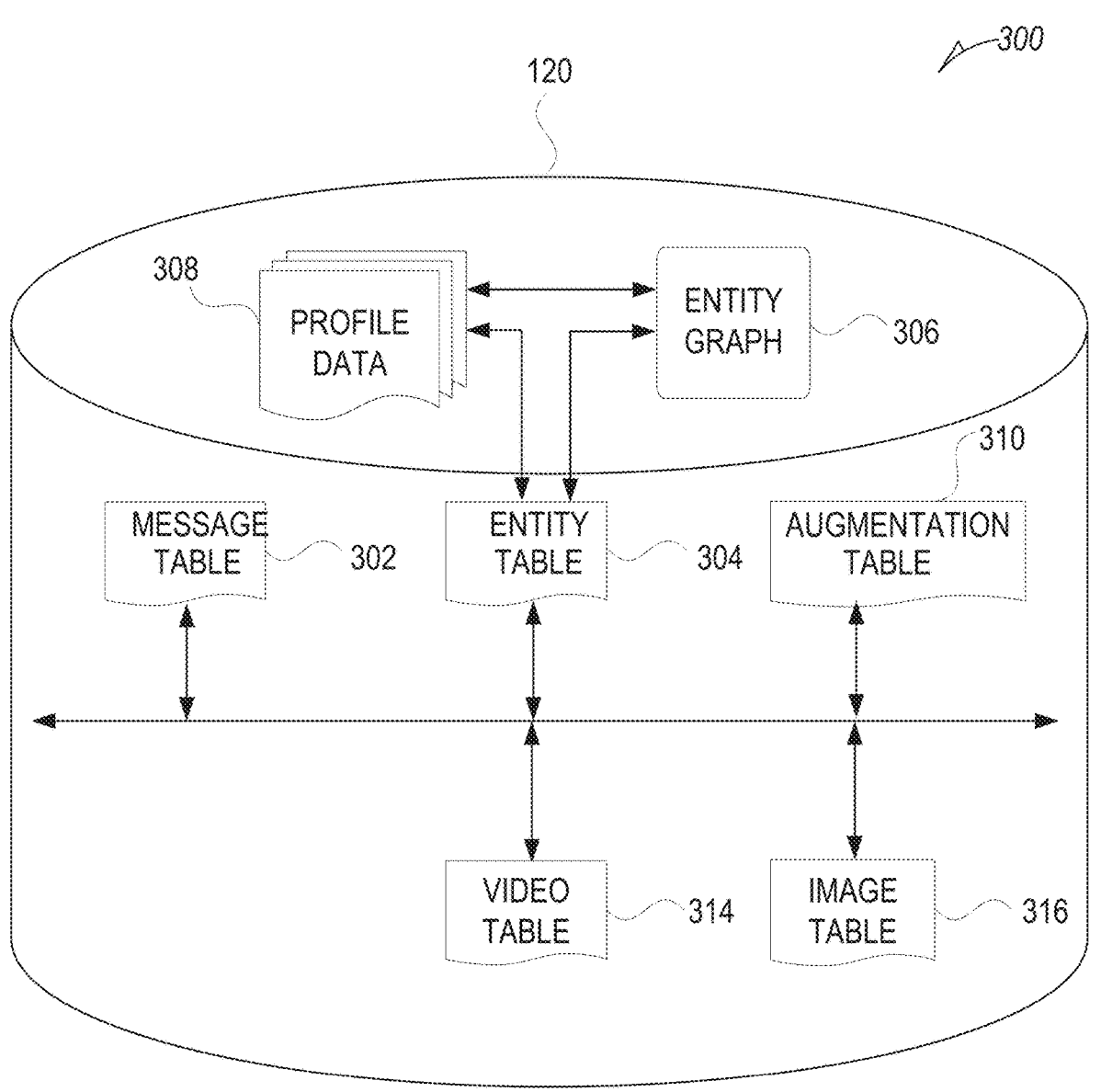
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has a "friend" relationship or is "following," and also the identification of other entities and interests of a particular user.

System Architecture

Figure 2:
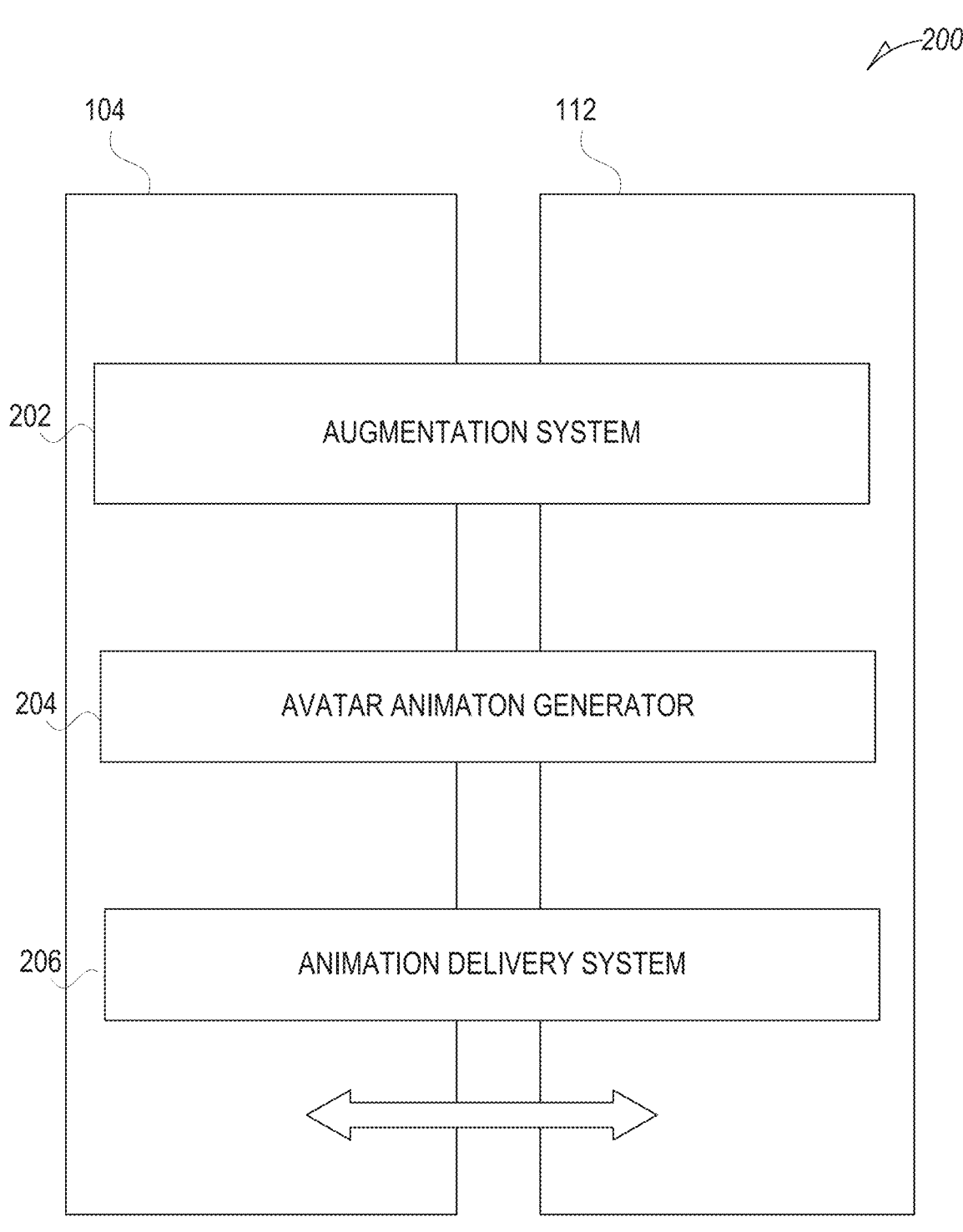
FIG. 2 is a diagrammatic representation of a messaging system, in accordance with some examples, that has both client-side and server-side functionality, and that includes an avatar call platform.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104, and on the sever-side by the application servers 112. These subsystems include, for example, an augmentation system 202, an animation delivery system 206, and an avatar animation generator 204.

The augmentation system 202 provides various functions that effectuate augmentation (e.g., annotating or otherwise modifying or editing) media content. For example, the augmentation system 202 provides functions related to the generation and publishing of media for communications facilitated by the messaging system 100. The media, including avatar images, may be stored in the database 120 and accessed through the database server 118.

In some examples, the augmentation system 202 includes or provides access to AR components that can be implemented using a programming language suitable for application development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some examples, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, generating an avatar animation video, or many numerous other such transformations. This includes both real-time modifications, as in generating an avatar animation video during an avatar communication process, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. For example, some examples may involve generating a 3D mesh model of the object or objects, and using transformations and animated textures of the model within the video to achieve the transformation. In other examples, tracking of points on an object may be used to place an image or texture, which may be two dimensional or three dimensional, at the tracked position. In still further examples, neural network analysis of video frames may be used to place images, models, or textures in content (e.g., images or frames of video). AR component data refers to the images, models, and textures used to create transformations in content, as well as to additional modeling and analysis information needed to achieve such transformations with object detection, tracking, and placement.

In some examples, the augmentation system 202 is utilized by or is part of the avatar call platform, in that an avatar call option is engaged by using the augmentation system 202 that can track objects in a video (such as body objects, face objects and so on) and replace the face or the entire body detected by the digital image sensor (raw camera) with an animated avatar video. The augmentation system 202 is configured to analyze local call data (video feed and/or audio) and, based on the local call data generate information representing respective facial expressions of the face depicted in the frames of the video feed. Information representing a facial expression and movement of facial features is referred to as avatar animation data, in the context of an avatar call platform.

The augmentation system 202 includes or is in communication with an avatar animation generator 204. The avatar animation generator 204 is configured to generate an avatar animation video based on the avatar animation data and an avatar image.

The animation delivery system 206 is configured to communicate, from one client device that is a party to a video call, to another client device that is a party to the video call, information needed for rendering the avatar animation video generated by the avatar animation generator 204. Such information may be a compressed version of the avatar animation video. In some examples, the avatar call platform is configured such that the animation delivery system 206 communicates the avatar animation data, or a compressed version of the avatar animation data, from a first client device to a second client device, and the avatar animation generator 204 generates the avatar animation video based on the avatar animation data at the second client device. It will be noted that, for the purposes of this description, various components engaged in the avatar communication process, such as, for example, the augmentation system 202, the avatar animation generator 204 the animation delivery system 206, are referred to, collectively, as the avatar call platform.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. The payload of a message may include content generated using customized image reprocessing. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. With reference to the functionality provided by the AR component, the entity graph 306 stores information that can be used, in cases where the AR component is configured to permit using a portrait image of a user other than that of the user controlling the associated client device for modifying the target media content object, to determine a further profile that is connected to the profile representing the user controlling the associated client device. As mentioned above, the portrait image of a user may be stored in a user profile representing the user in the messaging system.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected or automatically assigned avatar representation (or collection of such avatar representations). Such avatar representation may be referred to as an avatar image or simply avatar. A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time. In some examples, an animated version of the user's avatar is used in video calling, replacing the live video feed of the caller with an animated avatar video, in which the face of the animated figure moves in a way that matches what the caller is saying during the call.

The database 120 also stores augmentation data in an augmentation table 310. The augmentation data is associated with and applied to videos (for which data is stored in a video table 314) and images (for which data is stored in an image table 316). In some examples, the augmentation data is used by various AR components. An example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications.

AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. For example, an avatar animation video may be generated based on the live video being captured by a digital image sensor of a client device 102 and presented in lieu of the live video during a video call session between client devices. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

As mentioned above, the video table 314 stores video data that, in some examples, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Process Flow and a User Interface

Figure 4:
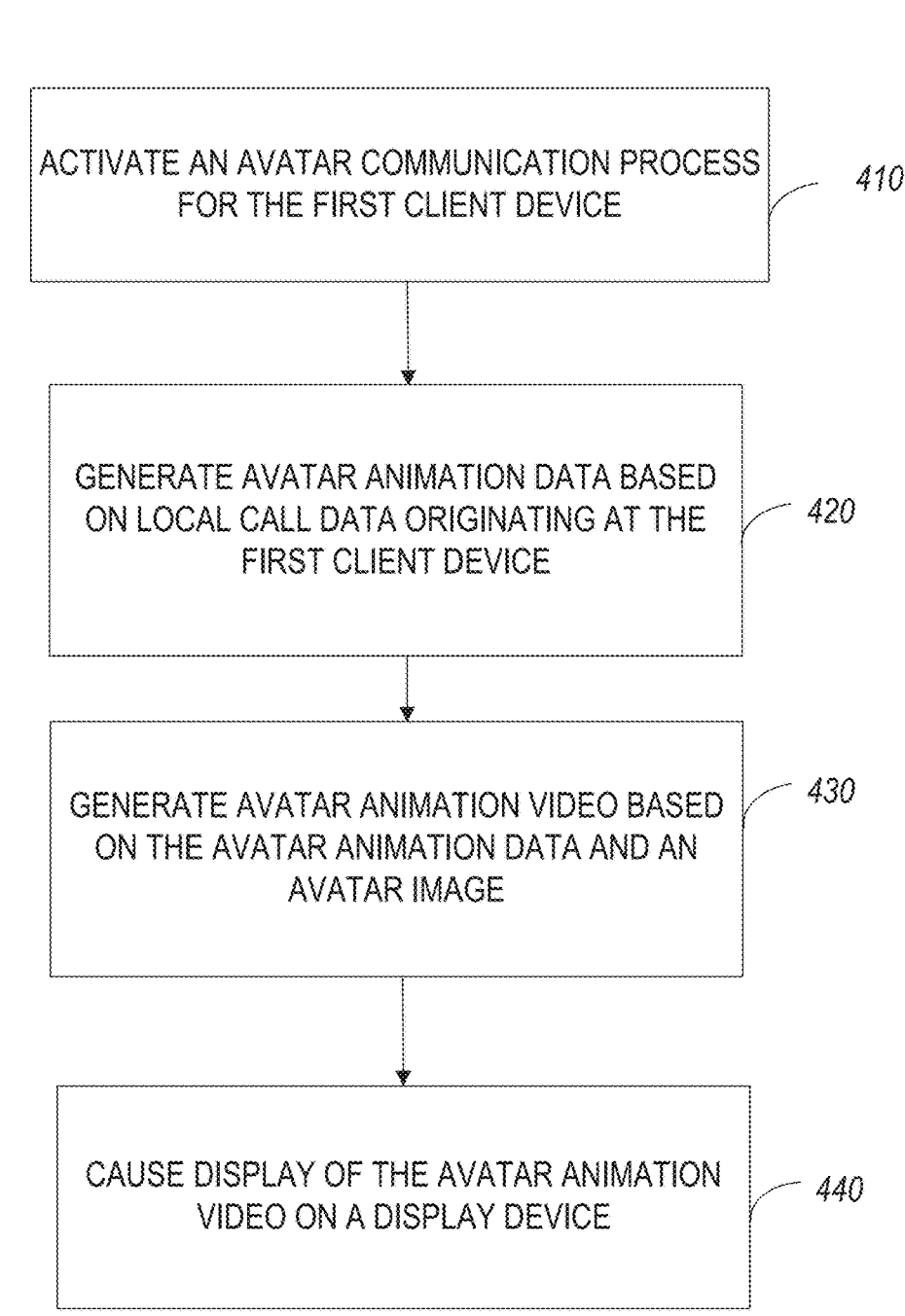
FIG. 4 is a flowchart illustrating an avatar communication process during a video call session between a first client device and a second client device, in accordance with some examples.

FIG. 4 is a flowchart of a method 400 for enhancing users' experience of video calling, in accordance with some examples. The method 400 may be performed by processing logic that may comprise hardware (e.g., dedicated logic, programmable logic, microcode, etc.), software, or a combination of both.

In some examples, some or all processing logic resides at the client device 102 of FIG. 1 and/or at the messaging server system 108 of FIG. 1. The method 400 commences at operation 410, at a first client device executing a video calling application, the avatar call platform activates an avatar communication process. When an avatar communication process is activated and a call session between the first client device and a second client device is in progress, the video calling application continuously receives local call data from the associated video and/or audio sensors local to the first client device and transmits it over a network to the second client device.

An avatar communication process can be activated in response to the detecting a request associated with a user-selectable element presented on a user interface (UI) generated by the messaging system and displayed by the video calling application at the first client device. In some examples, a user-selectable element actionable to activate the avatar communication process is presented in response to detecting a request to disallow video in the video call session.

Figure 6:
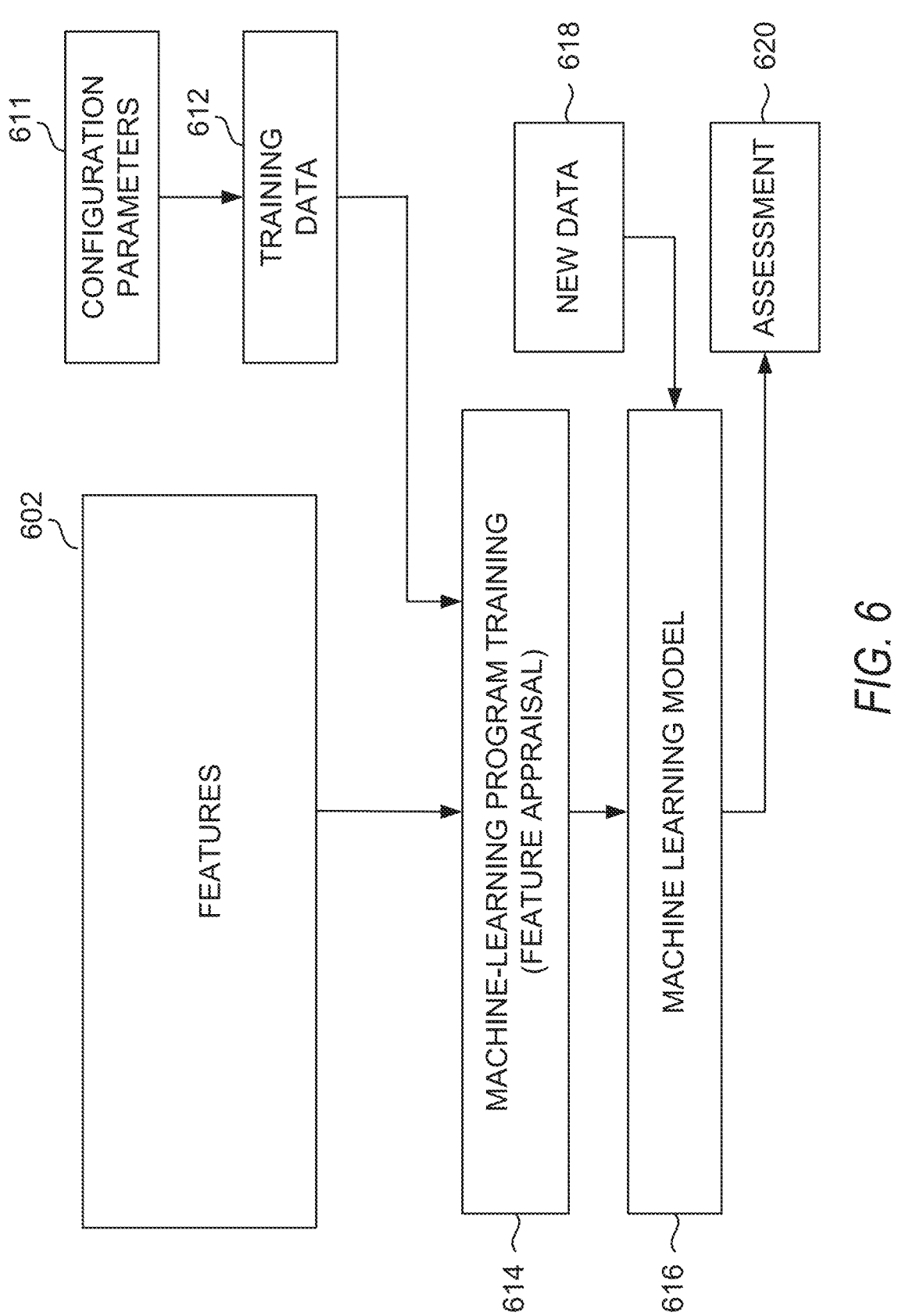
FIG. 6 is a diagrammatic representation of training and use of a machine-learning program, according to some examples.

At operation 420, the avatar call platform generates avatar animation data based on the local call data. As explained above, the avatar animation data can be used to produce an animated figure that conveys the facial expression and/or the movement of the lips matching what the caller is saying, for example. The local call data used for generating of the avatar animation data may be, in some examples, video feed obtained by means of the digital image sensor of the camera of the client device. For example, the avatar call platform may use an AR component for detecting a face object in the video and generate the avatar animation data based on characteristics of the face object in the video. In another example, the avatar call platform may use an AR component for detecting a hand object in the video and generate the avatar animation data based on characteristics of the hand object in the video, which may result in the avatar animation data representing a raised hand, for example. In some examples, the local call data used for generating avatar animation data is audio data obtained through a microphone of the client device. The avatar animation data is, in some examples, in the form of hints that represent facial expressions. The avatar animation data may be generated using a machine learning model (a trained neural network, for example) provided with the augmentation system 202. A diagrammatic representation of training and use of a machine-learning program is shown in FIG. 6, which is described further below.

At operation 430, the avatar animation generator 204 generates an avatar animation video that includes an animated figure that conveys the facial expression and/or the movement of the lips matching what the caller is saying, for example. The avatar animation video is generated based on the avatar animation data (such as, for example, hints) and an avatar image. In some examples, where the video call session is associated with a user profile representing a user in the messaging system, the avatar image is a cartoon representation of the user in the messaging system.

At operation 440, the avatar call platform causes display of the avatar animation video on a display device, such as, for example, the screen of the first client device, such that the user can see the result of the avatar communication process. The avatar call platform is also configured to communicate, to the other client device participating in the call session, information for causing the avatar animation video to be displayed on the screen of the other client device. The information for causing the avatar animation video to be displayed on the screen of the other client device, in some examples, is a compressed version of the avatar animation video generated at the first client device. In some examples, the information for causing the avatar animation video to be displayed on the screen of the other client device is the avatar animation data (which can be first compressed), in which case the avatar animation video is generated at the second client device and then displayed on the screen of the second client device.

Figure 5:
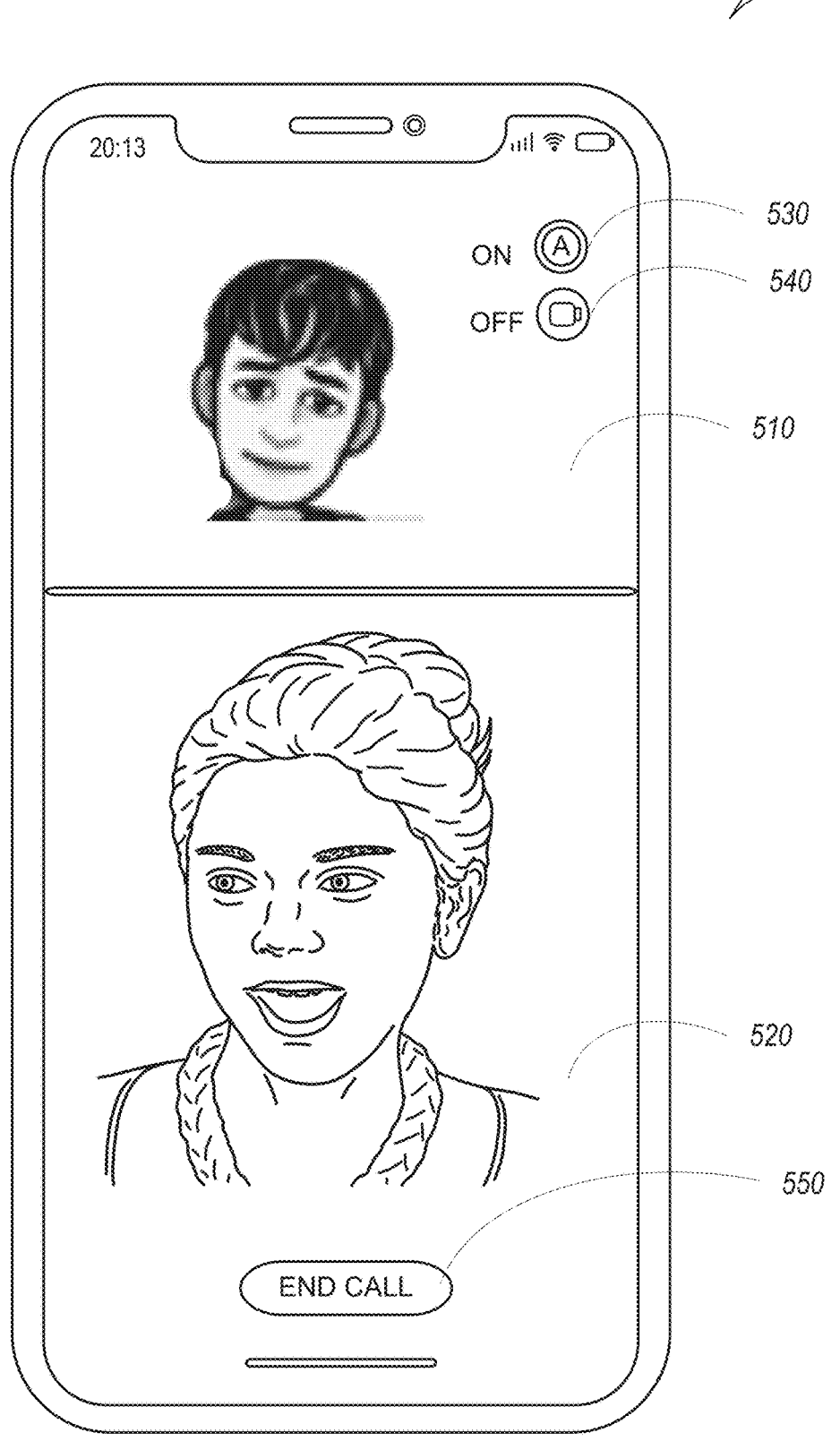
FIG. 5 illustrates a user interface displayed during a video call session between a first client device and a second client device when an avatar communication process is activated, in accordance with some examples.

FIG. 5 illustrates a UI 500 displayed during a video call session between a first client device and a second client device when an avatar communication process is activated, in accordance with some examples. The UI 500, shown as presented on the screen of a local client device, displays an avatar animation video in area 510 and a video of a caller from a remote device in area 520. The UI 500 includes a user-selectable element 530 indicating that the avatar communication session is in progress, a user-selectable element 540 indicating that the video is disallowed at the local client device, and a user-selectable element 550 actionable to end the video call session.

Machine Learning Program

FIG. 6 illustrates the training and use of a machine-learning program, according to some examples. Machine learning (ML) explores the study and construction of algorithms, also referred to herein as tools, that may learn from existing data and make predictions about new data. Such machine-learning algorithms operate by building an ML model 616 utilizing training data 612 in order to make data-driven predictions or decisions expressed as outputs or assessments 620.

Training an ML algorithm involves analyzing large amounts of data (e.g., from several gigabytes to a terabyte or more) in order to find data correlations. The ML algorithms utilize the training data 612 to find correlations among the identified features 602 that affect the outcome or assessment 620. The training data 612 comprises examples of values for the features 602. The machine-learning algorithms utilize the training data 612 to find correlations among identified features 602 that affect the outcome. A feature 602 is an individual measurable property of a phenomenon being observed. During training 614, the ML algorithm analyzes the training data 612 based on identified features 602 and configuration parameters 611 defined for the training. The result of the training 614 is an ML model 616 that is capable of taking inputs to produce assessments.

Many ML algorithms include configuration parameters 611, and the more complex the ML algorithm, the more parameters there are that are available to the user. The configuration parameters 611 define variables for an ML algorithm in the search for the best ML model. The training parameters include model parameters and hyperparameters. Model parameters are learned from the training data, whereas hyperparameters are not learned from the training data, but instead are provided to the ML algorithm. Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a very time-consuming task that makes use of a large amount of computer resources. When the ML model 616 is used to perform an assessment, new data 618 is provided as an input to the ML model 616, and the ML model 616 generates the assessment 620 as output.

In some examples, the ML model 616 is provided with the avatar call platform and is configured to generate avatar animation data based on the local call data. In one example, the ML model 616 estimates respective values of hints that describe shape and positioning of facial features on a face object of an avatar image. In this example, the new data 618 includes local data being captured while a video call session is in progress and an avatar communication session is activated. The training data used to train the ML model 616 that, comprises images representing faces depicting facial expressions with associated hints.

Machine Architecture

Figure 7:
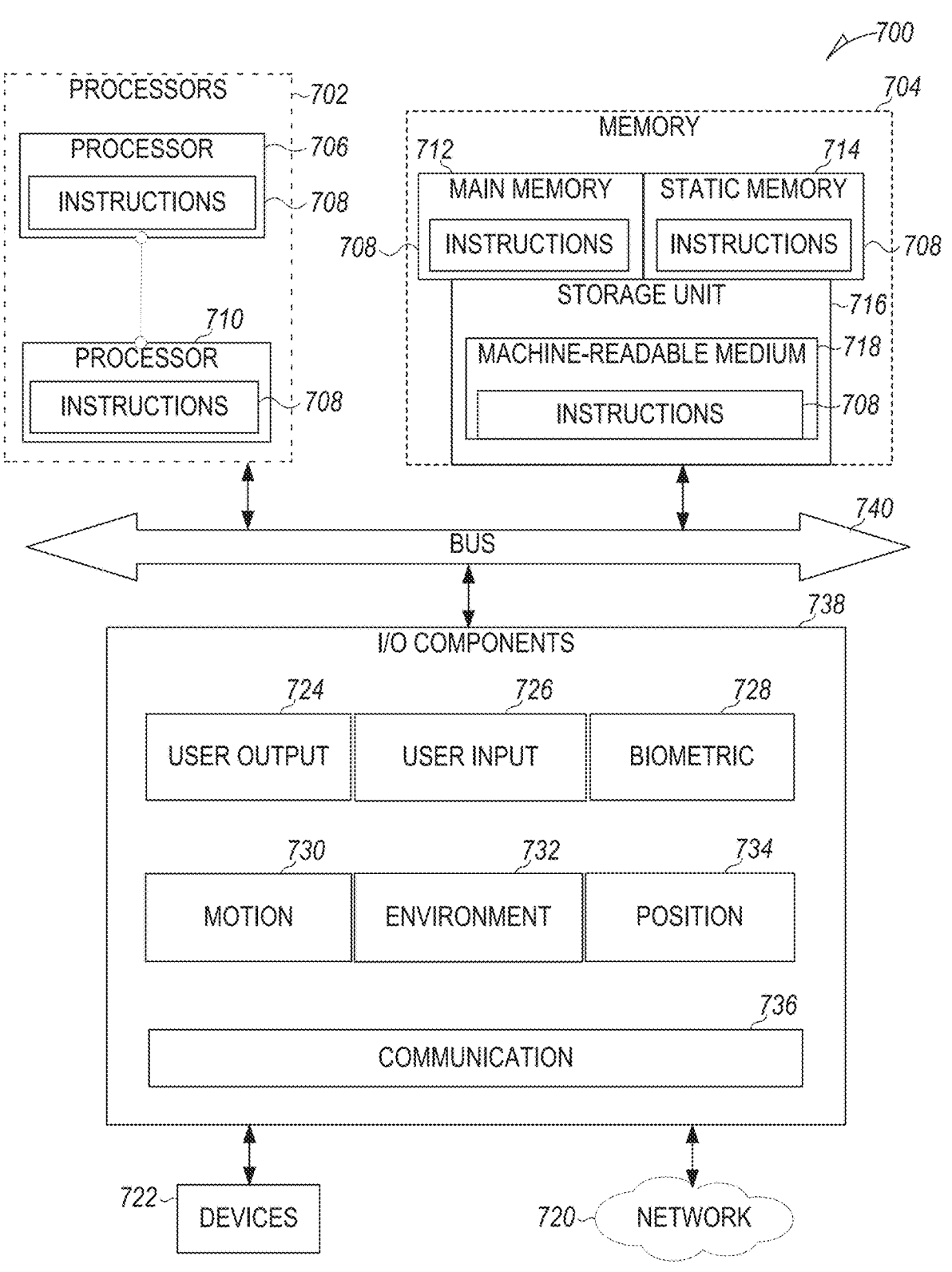
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein. The machine 700, for example, may comprise the client device 102 or any one of a number of server devices forming part of the messaging server system 108. In some examples, the machine 700 may also comprise both client and server systems, with certain operations of a particular method or algorithm being performed on the server-side and with certain operations of the particular method or algorithm being performed on the client-side.

The machine 700 may include processors 702, memory 704, and input/output I/O components 738, which may be configured to communicate with each other via a bus 740. In an example, the processors 702 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single-core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 740. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 771, within at least one of the processors 702 (e.g., within the Processor's cache memory), or any suitable combination thereof, during execution thereof by the machine 700.

The I/O components 738 may include a wide variety of components to receive input, provide output, produce output, transmit information, exchange information, capture measurements, and so on. The specific I/O components 738 that are included in a particular machine will depend on the type of machine. For example, portable machines such as mobile phones may include a touch input device or other such input mechanisms, while a headless server machine will likely not include such a touch input device. It will be appreciated that the I/O components 738 may include many other components that are not shown in FIG. 7. In various examples, the I/O components 738 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 738 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 730 include acceleration sensor components (e.g., accelerometer), gravitation sensor components, rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 738 further include communication components 736 operable to couple the machine 700 to a network 720 or devices 722 via respective coupling or connections. For example, the communication components 736 may include a network interface Component or another suitable device to interface with the network 720. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 712, static memory 714, and memory of the processors 702) and storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed examples.

The instructions 708 may be transmitted or received over the network 720, using a transmission medium, via a network interface device (e.g., a network interface component included in the communication components 736) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 722.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 704 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:

in a messaging system for exchanging data over a network, in a video call session between a first device and a second device, presenting, at the first device, a first user-selectable element actionable to disallow video in the video call session;

responsive to detecting activation of the first user-selectable element, presenting, at the first device, a second user-selectable element actionable to activate an avatar communication process; and responsive to detecting activation of the second user-selectable element, activating an avatar communication process for the first device, the avatar communication process comprising:

generating an avatar animation video based on avatar animation data, the avatar animation data comprising a plurality of data points representative of locations of facial features in an area representing a face, the plurality of data points indicative of directional distances in numbers of points relative to neutral locations of the facial features;

generating a plurality of frames for the avatar animation video to depict movements of the facial features based on changes in the plurality of data points during the movements; and causing display of the avatar animation video on a display.

2. The method of claim 1, wherein the avatar communication process comprises:

analyzing local call data to detect the movements of the facial features, wherein the plurality of data points are based on the local call data.

3. The method of claim 1, wherein the avatar communication process comprises:

tracking objects, including a face object, detected in local call data comprising a video feed, the avatar animation video generated based on characteristics of the objects.

4. The method of claim 1, wherein the avatar communication process comprises:

analyzing audio data of to determine one or more facial expressions associated with the audio data, wherein the plurality of data points is based on the one or more facial expressions.

5. The method of claim 1, wherein the avatar communication process comprises:

generating a compressed version of the avatar animation video; and communicating the compressed version of the avatar animation video to the second device.

6. The method of claim 1, further comprising:

causing display of a live video of a user of the second device on the display simultaneously with the avatar animation video.

7. The method of claim 1, further comprising:

responsive to detecting activation of the second user-selectable element, presenting, at the first device, a third user-selectable element indicative that the avatar communication process is active and actionable to end the avatar communication process.

8. The method of claim 1, wherein the second user-selectable element actionable to activate the avatar communication process is presented while a camera of the first device is on.

9. The method of claim 1, further comprising:

presenting, at the first device, a third user-selectable element actionable to end the video call session.

10. The method of claim 1, wherein the avatar animation video is generated based on an avatar image selected from a plurality of avatar images, each avatar image associated with a respective status or activity.

11. A system comprising:

one or more processors; and a non-transitory computer readable storage medium comprising instructions that when executed by the one or more processors cause the system to perform operations comprising:

in a video call session between a first device and a second device, presenting, at the first device, a first user-selectable element actionable to disallow video in the video call session;

responsive to detecting activation of the first user-selectable element, presenting, at the first device, a second user-selectable element actionable to activate an avatar communication process; and responsive to detecting activation of the second user-selectable element, activating an avatar communication process for the first device, the avatar communication process comprising:

generating an avatar animation video based on avatar animation data, the avatar animation data comprising a plurality of data points representative of locations of facial features in an area representing a face, the plurality of data points indicative of directional distances in numbers of points relative to neutral locations of the facial features;

generating a plurality of frames for the avatar animation video to depict movements of the facial features based on changes in the plurality of data points during the movements; and causing display of the avatar animation video on a display.

12. The system of claim 11, wherein the avatar communication process comprises:

analyzing local call data to detect the movements of the facial features, wherein the plurality of data points are based on the local call data.

13. The system of claim 11, wherein the avatar communication process comprises:

tracking objects, including a face object, detected in local call data comprising a video feed, the avatar animation video generated based on characteristics of the objects.

14. The system of claim 11, wherein the avatar communication process comprises:

analyzing audio data of to determine one or more facial expressions associated with the audio data, wherein the plurality of data points is based on the one or more facial expressions.

15. The system of claim 11, wherein the avatar communication process comprises:

generating a compressed version of the avatar animation video; and communicating the compressed version of the avatar animation video to the second device.

16. The system of claim 11, the operations further comprising:

causing display of a live video of a user of the second device on the display simultaneously with the avatar animation video.

17. The system of claim 11, the operations further comprising:

responsive to detecting activation of the second user-selectable element, presenting, at the first device, a third user-selectable element indicative that the avatar communication process is active and actionable to end the avatar communication process.

18. The system of claim 11, wherein the second user-selectable element actionable to activate the avatar communication process is presented while a camera of the first device is on.

19. The system of claim 11, the operations further comprising:

presenting, at the first device, a third user-selectable element actionable to end the video call session.

20. A machine-readable non-transitory storage medium having instruction data executable by a machine to cause the machine to perform operations comprising:

in a messaging system for exchanging data over a network, in a video call session between a first device and a second device, presenting, at the first device, a first user-selectable element actionable to disallow video in the video call session;

responsive to detecting activation of the first user-selectable element, presenting, at the first device, a second user-selectable element actionable to activate an avatar communication process; and responsive to detecting activation of the second user-selectable element, activating an avatar communication process for the first device, the avatar communication process comprising:

generating an avatar animation video based on avatar animation data, the avatar animation data comprising a plurality of data points representative of locations of facial features in an area representing a face, the plurality of data points indicative of directional distances in numbers of points relative to neutral locations of the facial features;

generating a plurality of frames for the avatar animation video to depict movements of the facial features based on changes in the plurality of data points during the movements; and causing display of the avatar animation video on a
display.

\* \* \* \* \*